Nov. 6, 1962
W. E. KRESSIN
3,062,250
TRIMMING MACHINE FOR ONIONS OR THE LIKE
Filed Oct. 19, 1959
2 Sheets-Sheet 1
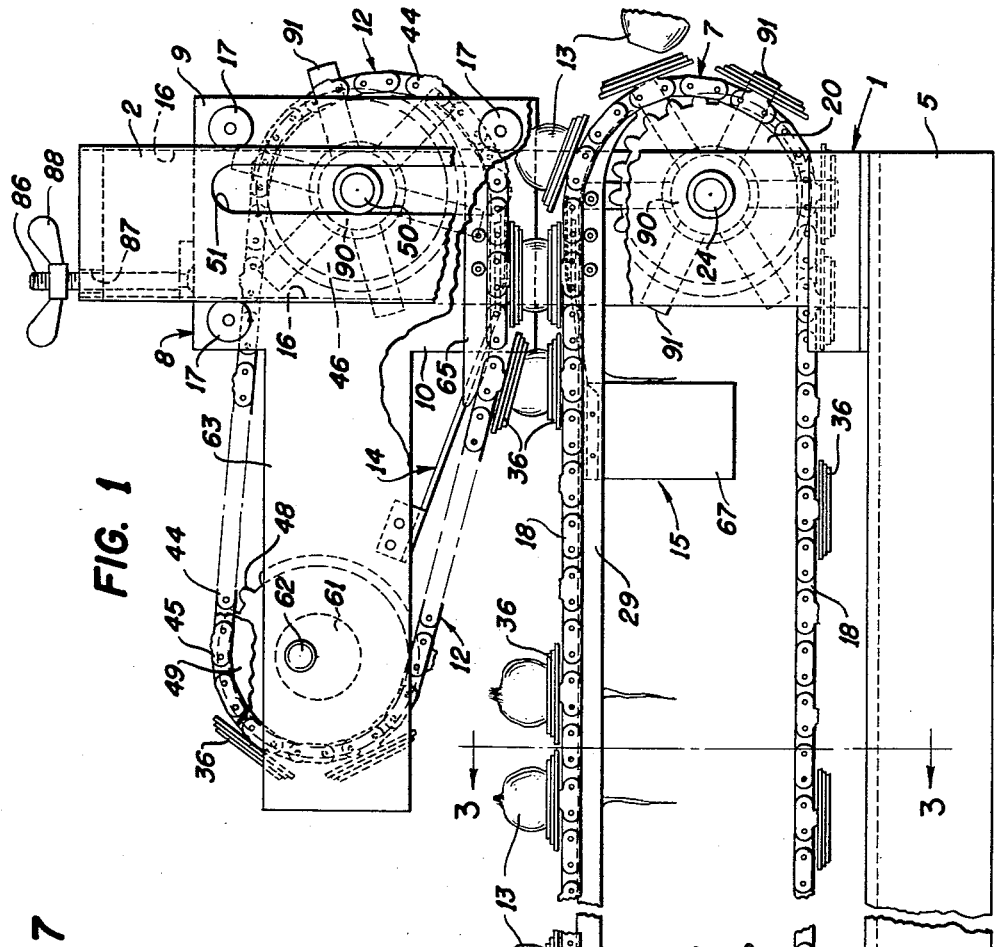
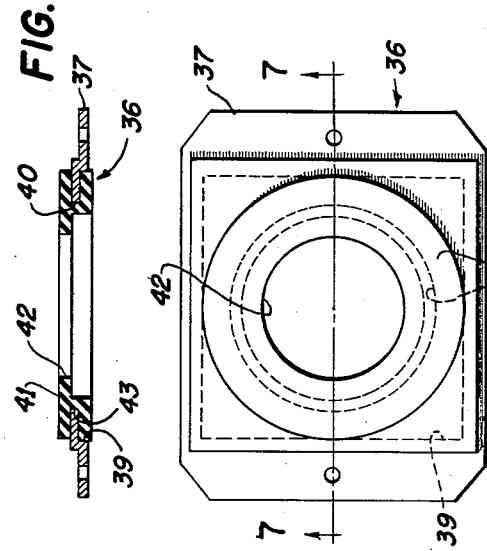
INVENTOR.
WILLIAM E. KRESSIN
BY
Andrus & Starke
Attorneys Nov. 6, 1962
W. E. KRESSIN
3,062,250
TRIMMING MACHINE FOR ONIONS OR THE LIKE
Filed Oct. 19, 1959
2 Sheets-Sheet 2
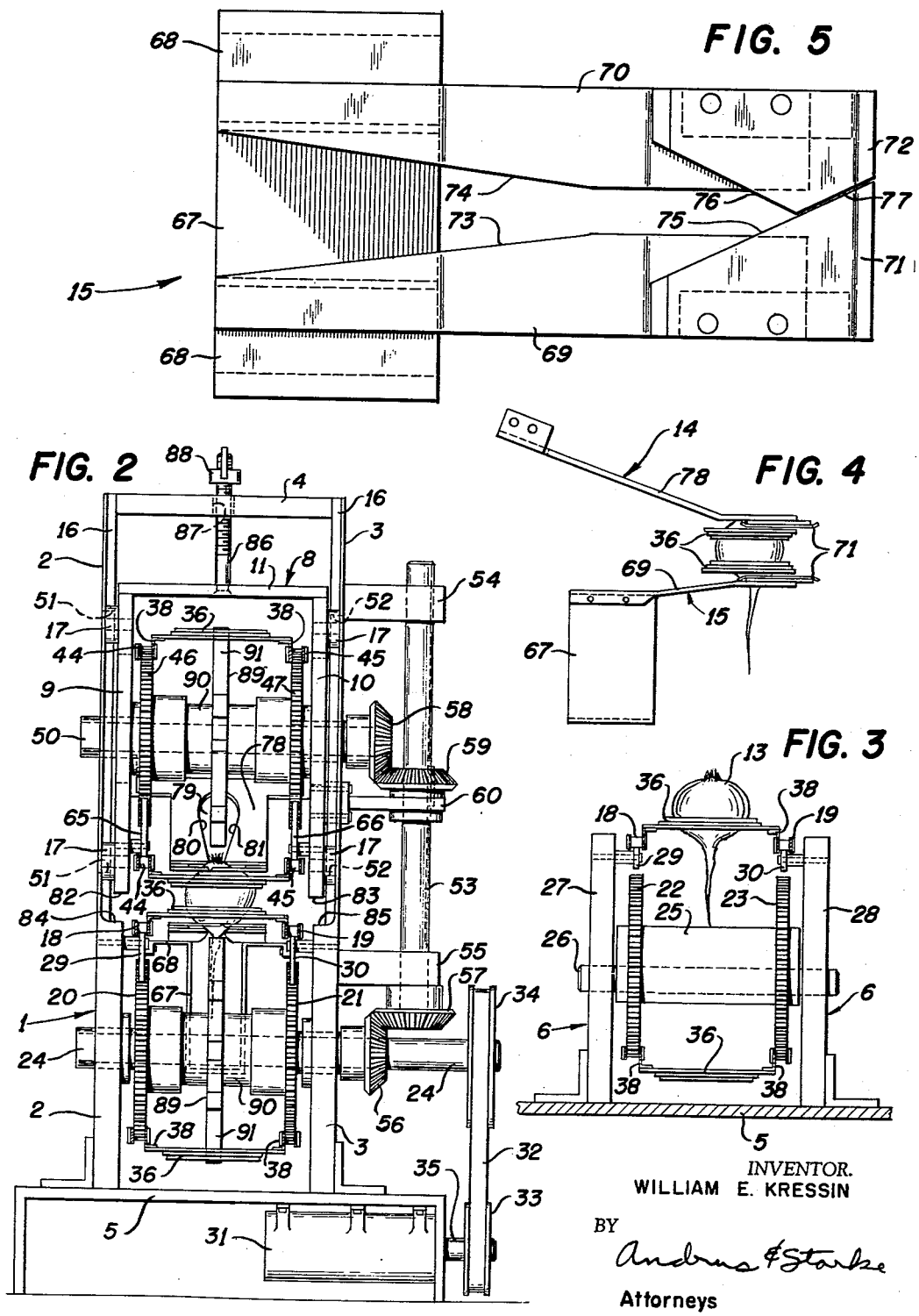
INVENTOR.
WILLIAM E. KRESSIN
BY Andrus & Starke
Attorneys

United States Patent Office 3,062,250
Patented Nov. 6, 1962

3,062,250
TRIMMING MACHINE FOR ONIONS OR THE LIKE
William E. Kressin, 615 Lafayette St., Watertown, Wis.
Filed Oct. 19, 1959, Ser. No. 847,356
11 Claims. (Cl. 146—83)

This invention relates to a trimming machine for onions or the like whereby the opposed root and stem portions are removed.

In the commercial canning of onions, the root and stem portions are generally removed by individuals using suitable knives for that purpose. In spite of the relatively large number of people busied in this step of the canning procedure, hand trimming is slow and has been a limiting factor in production. Furthermore, the considerable variation in the amounts trimmed from the onions, even by the same individual, resulted in a lack of uniformity which was detrimental to the appearance of the product.

According to the invention, the machine for trimming onions or the like comprises a continuous conveyor which carries a plurality of spaced retainers each of which is adapted to receive and support an onion for trimming. A second continuous conveyor operating in timed relation with the first conveyor and spaced therefrom carries retaining means which engages the opposite portion of each onion. Secured between the opposed conveyors, the onions are carried between spaced cutting members which simultaneously trim or remove the opposed root and stem portions from the onions. Knock-out means, also operating in timed relatin with the conveyors, are provided to assure removal of the trimmed onions from the conveyors.

The drawings furnished herewith illustrate the best mode of carrying out the invention as presently contemplated and set forth hereinafter.

In the drawings:

FIG. 1 is a side elevation with parts broken away showing the trimming machine of this invention;

FIG. 2 is an end elevation of the trimming machine with portions of the conveyors broken away and sectioned;

FIG. 3 is a view taken on line 3—3 of FIG. 1;

FIG. 4 is a diagrammatic view showing in elevation the cutting members as employed in the trimming machine;

FIG. 5 is a plan view of the lower cutting member with the means for guiding the onions into the angularly related blades;

FIG. 6 is a plan view of one of the conveyor retaining means; and

FIG. 7 is a sectional view taken on line 7—7 of FIG. 6.

Referring to the drawings, the trimming machine comprises a main frame 1 including transversely spaced frame members 2 and 3 connected at their upper ends by the transverse member 4. The main frame 1 is mounted at one end of the longitudinally extending table-like support 5 and together with the shaft stand 6 mounted at the other end of support 5, supports the main conveyor 7.

A floating inner frame 8 is disposed for relative movement within the upper portion of the main frame 1 and comprises the transversely spaced side frame members 9 and 10 connected at their upper ends by the transverse member 11. The inner frame 8 supports a second conveyor 12 which cooperates with the main conveyor 7 in a manner hereinafter described to carry onions 13 through the vertically spaced cutting members 14 and 15 provided respectively on the inner frame member and main frame member for trimming the opposed root and stem portions therefrom.

To accommodate onions of varying size between the conveyors 7 and 12 and cutting members 14 and 15, the inner frame member 8 is freely movable vertically relative to the main frame. Longitudinally spaced and vertically extending tracks 16 are provided on the respective main frame members 2 and 3 which serve as guides for the longitudinally and vertically spaced rollers 17 carried by members 9 and 10 of the inner frame 8.

The main conveyor 7 comprises a pair of transversely spaced continuous roller chains 18 and 19 which extend around the drive sprockets 20 and 21, respectively, supported from the main frame, and the idler sprockets 22 and 23, respectively, supported from the shaft stand 6. The conveyor 7 is driven through the drive shaft 24 which carries sprockets 20 and 21 and is rotatably journalled in members 2 and 3 in the lower portion of the main frame 1.

The idler sprockets 22 and 23 are rotatably mounted on an eccentric 25 carried by shaft 26 supported in the transversely spaced vertical members 27 and 28 of the shaft stand 6. Upon rotation of shaft 26 within members 27 and 28, the eccentric 25 moves the axis of sprockets 22 and 23 relative to the drive sprockets 20 and 21 and thus provides a means for adjusting the tightness of the roller chains 18 and 19. Lock means, not shown, secure the shaft 26 relative to the respective members 27 and 28 after the chains have been adjusted to the desired tightness.

Horizontal guide rails 29 and 30 extend between the main frame 1 and the shaft stand 6 to provide a rigid guiding support for the upper reaches of the respective conveyor chains 18 and 19. Guide rail 29 is supported by main frame member 2 and shaft stand member 27 in the vertical plane of aligned sprockets 20 and 22 for support of the roller chain 18. Roller chain 19 travels on guide rail 30 supported by main frame member 3 and shaft stand member 23 in the vertical plane of aligned sprockets 21 and 23. Guide rails 29 and 30 are disposed above their correspondingly aligned sprockets and have arcuate end portions providing for generally tangential delivery and receipt of the respective roller chains to the corresponding sprockets. The arcuate portion of guide rails 29 and 30 providing for delivery of the conveyor chains 18 and 19 to the drive sprockets 20 and 21, respectively, begins generally at a location determined by a vertical plane extending through the axis of drive shaft 24.

The drive means for conveyor 7 includes the motor, speed reducer combination 31 mounted beneath the table-like support 5. A belt drive 32 connects the pulleys 33 and 34 mounted respectively on shaft 35 of the motor, speed-reducer combination and the portion of shaft 24 extending outwardly beyond main frame member 3. The drive means provides for clockwise movement of the main conveyor 7 as viewed in FIG. 1.

The transversely spaced roller chains 18 and 19 of conveyor 7 carry a plurality of longitudinally spaced onion retaining means 36 suspended therebetween. The retaining means 36, shown in detail in FIGS. 6 and 7, each comprise a generally rectangular plate 37 which extends between chains 18 and 19 and is adapted for securement to transversely aligned angle brackets 38 carried by the respective chains. Each plate 37 is provided with a generally rectangular shallow recessed portion 39 facing downwardly and having a circular opening 40 generally centrally thereof. The plates 37 each carry a resilient onion retaining member 41 having a circular opening 42 smaller than opening 40 in plate 37 and centrally of member 41 for supporting an onion with a portion of the onion projecting downwardly through the opening 42. The resilient member 41 extends through the opening 40 of plate 37 and is provided with a radially extending peripheral slot 43 having an inner diameter corresponding generally to the diameter of opening 40 for securement to the plate 37. The portion of resilient member 41 beneath slot 43 has a rectangular configuration corresponding generally in size with recess 39 and is disposed therein to substantially prevent relative rotation between the resilient member and its plate 37.

The second conveyor 12 supported by the floating inner frame 8 comprises a pair of transversely spaced continuous roller chains 44 and 45 which are generally vertically aligned with chains 18 and 19, respectively, of the main conveyor 7. The chains 44 and 45 extend around the upper drive sprockets 46 and 47, respectively, and the upper idler sprockets 48 and 49, respectively, carried by the inner frame 8.

The upper drive sprockets 46 and 47 are carried by the transverse shaft 50 which is journalled in frame members 9 and 10 of the movable inner frame 8 in vertical alignment with drive shaft 24. The ends of shaft 50 project outwardly beyond members 9 and 10 and are accommodated for vertical movement within the vertically extending slots 51 and 52 provided in the main frame members 2 and 3, respectively. The shaft 50 is driven from shaft 24 of the main conveyor 7 by a drive which includes a vertical shaft 53 supported for rotation within the vertically spaced bearing projections 54 and 55 extending outwardly from member 3 of the main frame 1. Meshing bevel gears 56 and 57 mounted respectively on shaft 24 and vertical shaft 53 provide for the rotation of shaft 53. The bevel gear 58 mounted on shaft 50 is driven by the bevel gear 59 which is rotatable with vertical shaft 53. The bevel gear 59 is slidable vertically on shaft 53 and is vertically supported enmesh with bevel gear 58 by the bearing member 60 which projects outwardly through slot 52 in main frame member 3 from the inner frame member 10. Since the bearing member 60 is carried by the inner frame 8, driving engagement is maintained between bevel gears 58 and 59 even when the inner frame moves vertically with respect to the main frame. The drive assembly for the second conveyor 12 provides that the second conveyor will move counterclockwise as viewed in FIG. 1 and will at all times be synchronized with the travel of the main conveyor 7.

The idler sprockets 48 and 49 of the second conveyor 12 are rotatably mounted on the eccentric 61 carried by shaft 62 supported by the arms 63 and 64 which extend longitudinally in the direction of shaft stand 6 from the respective inner frame members 9 and 10. The eccentric 61 moves the axis of sprockets 48 and 49 relative to the upper drive sprockets 46 and 47 upon rotation of shaft 62 to provide a tightness adjustment for roller chains 44 and 45 similar to the adjustment means provided for roller chains 18 and 19 of the main conveyor. Lock means, not shown, are provided to secure the shaft 62 relative to the arms 63 and 64 after the chains 44 and 45 have been adjusted to their proper tightness.

Shaft 62 is supported by arms 63 and 64 in a manner to place the axis of idler sprockets 48 and 49 above a horizontal plane through the axis of shaft 50 and thereby provide that the lower reach of the respective chains 44 and 45 travel downwardly at an acute angle with respect to the upper reaches of main conveyor chains 18 and 19. The portion of the lower reach of the respective conveyor chains 44 and 45 approaching the upper drive sprockets 46 and 47 are guided beneath the horizontally extending guide rails 65 and 66, respectively. The guide rails 65 and 66 are respectively supported from the frame members 9 and 10 of the inner frame 8 and extend beneath the respective sprockets 46 and 47. From a location determined generally by a vertical plane through the axis of shaft 50, rails 65 and 66 bend arcuately upwardly to provide for a generally tangential delivery of the respective chains 44 and 45 to the sprockets 46 and 47, respectively. The length of the horizontal chain guide surfaces of rails 65 and 66, respectively, is less than twice the spacing between the onion retaining means 36 to provide that as a particular onion approaches and passes through the trim cutting members 14 and 15 only that onion supports the inner frame 8 and its appurtenances relative to the main frame 1, as will be more fully described hereinafter.

Like the roller chains 18 and 19 of the main conveyor 7, the chains 44 and 45 of the second conveyor 12 carry a plurality of the longitudinally spaced onion retaining means 36, the spacing between means 36 being identical on the second conveyor as on the main conveyor.

In the operation of the trimming machine, the onions 13 are manually loaded onto the upper reach of the main conveyor 7 in the area generally between the shaft stand 6 and the ends of arms 63 and 64 of the inner frame 8. The individual onions are simply placed in the successive retaining means 36 of the moving conveyor 7 with the stem end portion of the onion projecting downwardly through the opening 42 a given distance. As the onions on the moving main conveyor 7 pass beneath the second conveyor 12, which is synchronized with the speed of travel of the main conveyor, the retaining means 36 on the second conveyor engage the onions from above with the root portions of the onions extending a given distance upwardly through the openings 41. Secured between conveyors 7 and 12 in the manner described, the onions are carried between the vertically spaced and opposed cutting members 14 and 15 for substantially simultaneous trimming of the root and stem portions from the passing onions.

The lower cutting member 15 includes a channel shaped support bracket 67 opening upwardly to provide a non-interfering passage for the depending onion stems. Appropriate transversely spaced horizontal flanges 68 on bracket 67 are adapted for securement between the main conveyor guide rails 29 and 30 for support of the bracket. Transversely spaced blade supporting members 69 and 70 are secured to the respective flanges 68 of bracket 67 and extend longitudinally in the direction of travel of conveyor 7 to support the horizontally disposed cutting blades 71 and 72 adjacent to a vertical plane through the axis of sprocket shafts 24 and 50 and rearwardly of the arcuate portions of conveyor guide rails 29 and 30. The forward portion of the adjacent inner edges 73 and 74 of blade supporting members 69 and 70 are generally engaged by the portion of the onions extending downwardly through opening 42 of the retaining means 36 and serve to properly guide an align the lower portion of the onion for trimming by blades 71 and 72. The relatively narrow spacing between the straight forward portions of edges 73 and 74 also generally limits the amount of onion stem portion projecting therethrough and thus serves as a gauge establishing the maximum amount to be removed from the onion.

The cutting edges 75 and 76 for blades 71 and 72 are angularly related in a V-shaped configuration to provide for progressive cutting as the onions pass through the blades. Forwardly of the V-shaped configuration of cutting edges, the blades 71 and 72 are spaced apart to provide a clearance 77 along the line of cutting edge 75 which continues to the end of blade 71. The clearance 77 serves as a relief to permit passage for any stem portion remaining uncut. Any such remaining uncut portions are then cut by the continuing cutting edge 75 as the onion continues over the cutting blades.

The upper cutting member 14 comprises plate member 78 adapted at one end for securement between arms 63 and 64 of the movable inner frame 8. The plate member 78 is provided with a central recess 79 having opposed edges 80 and 81 which are adapted to guide, align and gauge the root portion of the onions extending upwardly through openings 42 of the retaining means 36 carried by the second conveyor 12 in preparation for trimming. The end of plate member 78 opposite from its securement to the inner frame includes a substantially horizontal portion to each side of recess 79 for supporting the upper horizontal cutting blades 71 and 72, similarly to the blade supporting members 69 and 70 of the lower cutting member 15, for trimming the onion root portions which project upwardly through openings 42 of the retaining means 36. Since the upper and lower sets of cutting blades 71 and 72 are substantially vertically aligned, the opposed root and stem trimming operations are performed substantially simultaneously.

Generally, the onions utilized for commercial canning are graded according to size and a run of one grade is completed before a run of another grade is begun. However, within a particular grade there is variation in size within given limits and unless this variation is accommodated by the trimming machine there can be no uniformity in the trimming operation. With the floating or movable inner frame 8, the machine of this invention is well adapted to accommodate variations in onion size.

When the trimming machine is not in use the lower ends 82 and 83 of inner frame members 9 and 10, respectively, may be brought to rest on shoulders 84 and 85 provided inwardly of main frame members 2 and 3, respectively. Prior to placing the machine in operation the position of the inner frame 8 relative to the main frame 1 is set to space the second conveyor 12 carried by the inner frame above the main conveyor 7 a somewhat smaller distance than would ordinarily be required by the smallest onion within the grade being run. To establish this minimum spacing between the conveyors 7 and 12, the floating inner frame 8 is provided with a threaded member 86 which extends upwardly through the hole 87 of the main frame transverse member 4. A wing nut 88 is threaded on member 86 on the opposite side of the transverse member from the inner frame and serves as the stop for setting the minimum spacing between the conveyors.

As onions of varying size pass through the trimming machine, the floating or freely movable inner frame 8 is adapted to adjust itself to accommodate the successive onions. Each onion approaching the trimming blades establishes the spacing between the conveyors 7 and 12 in accordance with its size. And as the inner frame 8 moves relative to the main frame 1 to accommodate a particular onion between the conveyors, the cutting member 14 carried thereby is similarly moved. Since the spacing between the cutting members 14 and 15 will vary in accordance to the spacing between the conveyors 7 and 12, there will be a substantial uniformity in the amounts trimmed or removed from successive onions.

While establishing the spacing between the conveyors 7 and 12, each onion supports the full weight of the inner frame and all its appurtenances. This weight tends to force the opposed resilient members 41 of the retaining means 36 carried by the spaced conveyors 7 and 12 farther onto the onion. While the resilience of members 41 substantially prevents the onions from becoming bruised, the holding pressure of members 41 on the onions may be increased to a point where gravity alone will not effect a release of the onions after the trimming operation is completed and as the retaining means 36 are carried by their respective conveyors 7 and 12 over the arcuate portions of the corresponding chain guide rails.

To assure proper unloading of the conveyors, a knockout wheel 89 is carried by the respective conveyor drive shafts 24 and 50. Each wheel 89 comprises a hub 90 from which a plurality of circumferentially spaced spokes 91 radiate. The respective shafts 24 and 50 carry the wheels 89 midway between their respective conveyor drive sprockets placing the spokes 91 in alignment with the openings 42 of the onion retaining means 36 carried by the respective conveyors. The angular spacing of spokes 91 corresponds to the spacing between the retaining means 36 as the respective conveyors travel around their corresponding drive sprockets and the wheels 89 are synchronized to align the spokes with the successive openings 42. The spokes of wheels 89 extend outwardly beyond the circumference of the corresponding drive sprockets and are adapted to enter openings 42 of resilient members 41 as the successive retaining means 36 move with their respective conveyors over the arcuate end portions of the chain guide rails and onto the corresponding drive sprockets to provide positive ejection of the trimmed onions.

In practice, it has been found that when cutting members 14 and 15 and retaining means 36 are fabricated to accommodate a run of a given grade size of onions, they are generally suitable also for runs of the next adjacent grades. When the grade size variation is larger, however, it will be necessary between runs to replace the cutting members 14 and 15 and the retaining means 36 in accordance with the new grade size to be run.

As hereinbefore indicated the onion trimming machine of this invention has provided a great advantage over earlier methods. Not only has it brought about a substantial increase in production, but it has also provided a uniformity of product heretofore unattainable.

Various modes of carrying out the invention are contemplated as being within the scope of the following claims particularly pointing out and distinctly claiming the subject matter which is regarded as the invention.

I claim:

1. In a machine for trimming onions or the like, a pair of relatively movable support members, cutting means carried in spaced relation by the respective support members to cut in spaced planes and being adapted to trim opposed root and stem portions from onions passing therebetween, synchronized driven endless conveyor means carried by the respective support members and adapted to receive onions therebetween and carry same through spaced cutting means for trimming, said support members being movable relative to each other to accommodate onions of varying size between said conveyor means and cutting means and thereby provide for the removal of substantially uniform root and stem portions from successive onions regardless of the size of the onions.

2. A machine for trimming the opposed root and stem portions from onions or the like, comprising a main frame assemblage, a second frame assemblage movable relative to the main frame assemblage, an endless conveyor supported by the main frame assemblage, a second endless conveyor supported by the second frame assemblage, drive means connected to the conveyors for driving said conveyors synchronously, said conveyors being adapted to receive and carry successive onions therebetween for trimming and said second conveyor being movable together with said second frame assemblage relative to the first conveyor to accommodate onions of varying size, and cutting means supported in spaced relation from the main frame assemblage and the second frame assemblage respectively for cutting in spaced planes, the cutting means supported from the second frame assemblage being movable therewith to provide for removal of substantially uniform root and stem portions from successive onions regardless of the size of the onions.

3. A machine for trimming the opposed root and stem portions from onions, comprising a main frame assemblage, a second frame assemblage movable vertically relative to the main frame assemblage, a continuous conveyor supported by the main frame assemblage and having an upper reach, a second continuous conveyor supported by the second frame assemblage and having a lower reach spaced vertically above the upper reach of the first conveyor, drive means connected to the conveyors for driving said conveyors synchronously, said conveyors being adapted to secure successive onions between said reaches for trimming and said second conveyor being movable vertically together with said second frame assemblage relative to the first conveyor to accommodate onions of varying size, and cutting means supported in vertically spaced relation from the main frame assemblage and the second frame assemblage respectively for cutting in vertically spaced planes, the cutting means supported from the second frame assemblage being movable therewith to provide for removal of substantially uniform root and stem portions from successive onions regardless of the size of the onions.

4. A machine for trimming the opposed root and stem portions from onions, comprising a main frame assemblage, a second frame assemblage adapted to move vertically relative to the main frame assemblage, a continuous conveyor supported by the main frame assemblage and having a horizontal upper reach, a second continuous conveyor supported by the second frame assemblage and having a lower reach spaced vertically above the upper reach of the first conveyor, means connected to the conveyors for driving said conveyors synchronously, a plurality of longitudinally spaced onion retaining means carried by the respective conveyors with said means being vertically aligned between the opposed reaches to secure and carry successive onions therebetween for trimming, said second conveyor and the retaining means carried thereby being movable vertically together with said second frame assemblage relative to the first conveyor to accommodate onions of varying size between the opposed reaches of said conveyors, and cutting means supported in vertically spaced relation from the main frame assemblage and the second frame assemblage, respectively for cutting in vertically spaced planes, the cutting means supported from the second frame assemblage being movable therewith to provide for removal of substantially uniform root and stem portions from successive onions regardless of the size of the onions.

5. A machine for trimming the opposed root and stem portions from onions, comprising a main frame assemblage including a rigid longitudinally extending horizontal guide surface, a continuous conveyor supported by the main frame assemblage and including an upper reach movable on said horizontal guide surface, a second frame assemblage disposed above said conveyor and being adapted to freely move vertically relative to the main frame assemblage and including a rigid longitudinally extending horizontal guide surface, a second continuous conveyor supported by the second frame assemblage and having a lower reach movable beneath the corresponding guide surface and in spaced relation from the upper reach of said first conveyor, drive means connected to the conveyors for driving said conveyors synchronously, a plurality of equidistantly spaced onion retaining means carried by the respective conveyors with said means being vertically aligned between the opposed reaches to secure and carry successive onions therebetween for trimming, the lower reach of said second conveyor and the retaining means carried thereby being movable vertically together with said second frame assemblage and the rigid horizontal guide surface on the second frame assemblage having a length less than twice the distance between adjacent onion retaining means carried by said conveyors and thus providing for vertical movement of the second frame assemblage relative to the main frame assemblage to accommodate successive onions of varying size between the spaced reaches of said conveyors, and vertically spaced cutting means disposed between the horizontal guide surfaces and supported respectively from the main frame assemblage and the second frame assemblage, the cutting means supported from the second frame assemblage being movable therewith to provide for simultaneous removal of substantially uniform root and stem portions, respectively, from successive onions regardless of the size of the onions.

6. The invention as set forth in claim 5 wherein the onion retaining means carried by the respective conveyors comprise a rigid plate means secured between transversely spaced portions of the corresponding conveyor, a resilient seat member carried by the plate means and having a circular hole substantially midway between the transversely spaced conveyor portions, said resilient seat member being adapted to receive an onion with the portion of the onion to be trimmed projecting through said hole.

7. The invention as set forth in claim 5 wherein the respective continuous conveyors comprise transversely spaced roller chains driven by correspondingly spaced sprockets rotatably supported by the corresponding frame assemblage, and the onion retaining means are adapted for securement between the spaced roller chains.

8. A machine for trimming the opposed root and stem portions from onions, comprising a main frame assemblage including a pair of transversely spaced guide rails having upper longitudinally extending horizontal guide surfaces, a pair of continuous roller chain members supported by the main frame assemblage and including upper reaches movable respectively on said guide rails, a second frame assemblage disposed above said guide rails and being adapted to freely move vertically relative to the main frame assemblage and including a pair of transversely spaced guide rails having lower longitudinally extending horizontal guide surfaces, a second pair of continuous roller chain members supported by the second frame assemblage and having lower reaches movable beneath the corresponding guide rails and in spaced relation above the upper reaches of the first pair of roller chains, a plurality of onion retaining means having a resilient seat provided with a circular hole generally centrally of said means, said resilient seat being adapted to receive an onion with the portion of the onion to be trimmed projecting through said hole, said retaining means being secured between each corresponding pair of roller chains in equidistantly spaced relation to form a main conveyor and a second conveyor and further being vertically aligned between the lower reach of the second conveyor and the opposed upper reach of the main conveyor to provide for the securement of onions between the opposed resilient seats with the opposed root and stem portions projecting vertically through the respective holes, drive means connected to the conveyors for driving said conveyors synchronously to secure and carry successive onions therebetween for trimming, the lower reach of the second conveyor and the retaining means carried thereby being movable vertically together with said second frame assemblage and the lower horizontal guide surfaces on the second frame assemblage having a length less than twice the distance between adjacent onion retaining means carried by said conveyors and thus providing for vertical movement of the second frame assemblage relative to the main frame assemblage to accommodate successive onions of varying size between the spaced reaches of said conveyors, and cutting means supported from the main frame assemblage and the second frame assemblage in vertically spaced and aligned relation, said cutting means being disposed respectively beneath the retaining means carried by the main conveyor and above the retaining means carried by the second conveyor and at a location between the horizontal guide rails to provide for removal of the opposed root and stem portions of the onions projecting through the holes in the retaining means, the cutting means supported from the second frame assemblage being movable vertically therewith to provide for simultaneous removal of substantially uniform root and stem portions respectively from successive onions regardless of the size of the onions.

9. The invention of claim 8 wherein the respective pairs of conveyor roller chains are driven by sprockets mounted on drive shafts journalled in the corresponding frame assemblages, and knock-out means carried by the respective drive shafts and adapted to engage and eject the onions from the resilient seats of the retaining means after removal of the opposed root and stem portions from the onions.

10. The invention of claim 8 wherein each cutting means comprises a pair of generally horizontally disposed blade members having opposed cutting edges angularly related in a V-shaped configuration having the apex disposed forwardly in the direction of conveyor travel to provide for progressive removal of the onion portion, said blade members being spaced apart forwardly from the apex along the line of one containing cutting edge to provide a relief clearance for passage of partially cut onion portions with continued cutting, and longitudinally extending support members for the respective blade members, said support members being spaced apart transversely to provide opposed edges adapted to guide and align the onion portion projecting through the holes in the resilient seats of the onion retaining means with respect to the blade cutting edges and adapted further to serve as a gauge for establishing the maximum amount to be removed from an onion.

11. In a machine for trimming the opposed root and stem portions from onions or the like, spaced trimming cutters adapted to remove the opposed onion portions, each said cutter comprising a pair of generally planarly disposed blade members having opposed cutting edges angularly related in a generally V-shaped configuration with the apex of said configuration disposed forwardly in the direction of movement of an onion to be trimmed to provide for progressive removal of an onion portion, said blade members being spaced apart forwardly from the apex to provide a relief clearance for passage of partially cut onion portions and with one blade member having a continuing cutting edge adjacent said clearance to complete the severance of an onion portion, and longitudinally extending support members for the respective blade members, said support members being spaced apart transversely to provide opposed edges adapted to guide an onion with respect to the blade cutting edges and serve as a gauge for establishing the amount to be removed from an onion.

References Cited in the file of this patent
UNITED STATES PATENTS

| | | |
|---|---|---|
| 1,914,621 | Siemann | June 20, 1933 |
| 2,571,531 | Bridge | Oct. 16, 1951 |
| 2,788,037 | Carter | Apr. 9, 1957 |